Figure 1:
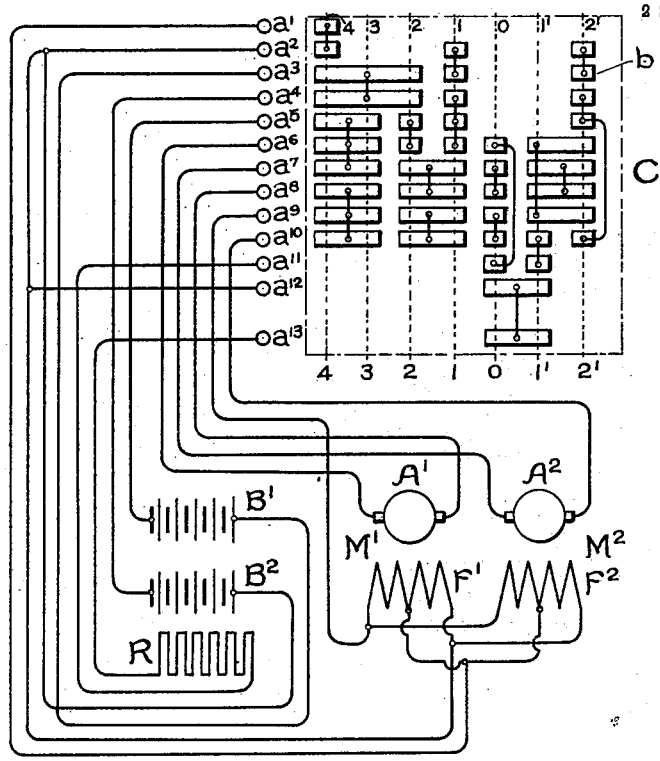

No. 724,021. PATENTED MAR. 31, 1903.
H. LEMP.
AUTOMOBILE VEHICLE.
APPLICATION FILED APR. 25, 1900.
NO MODEL. 2 SHEETS—SHEET 1.

Witnesses.
Edward Williams Jr.
Benjamin B. Hull

Inventor
Hermann Lemp
by Albert B. Davis
Atty.

No. 724,021. PATENTED MAR. 31, 1903.
H. LEMP.
AUTOMOBILE VEHICLE.
APPLICATION FILED APR. 25, 1900.
NO MODEL. 2 SHEETS—SHEET 2.
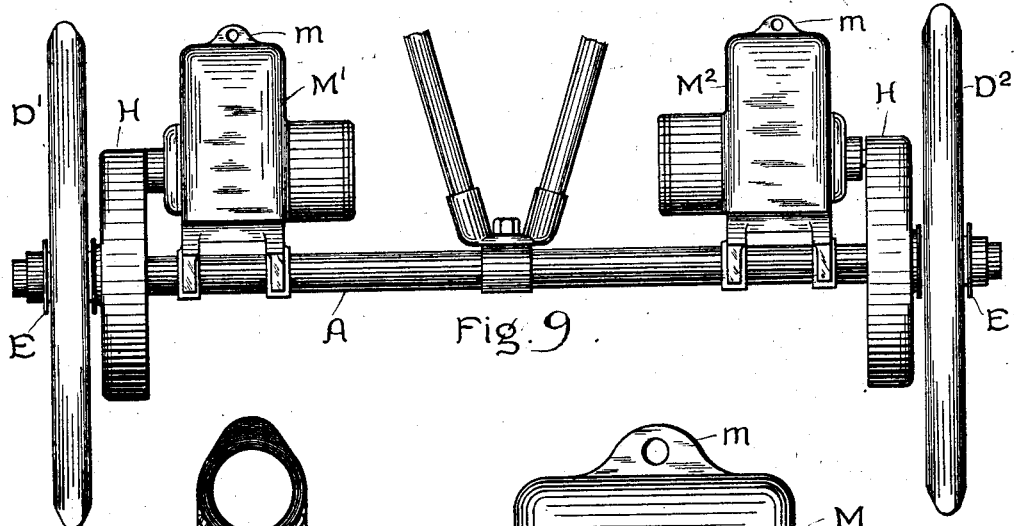
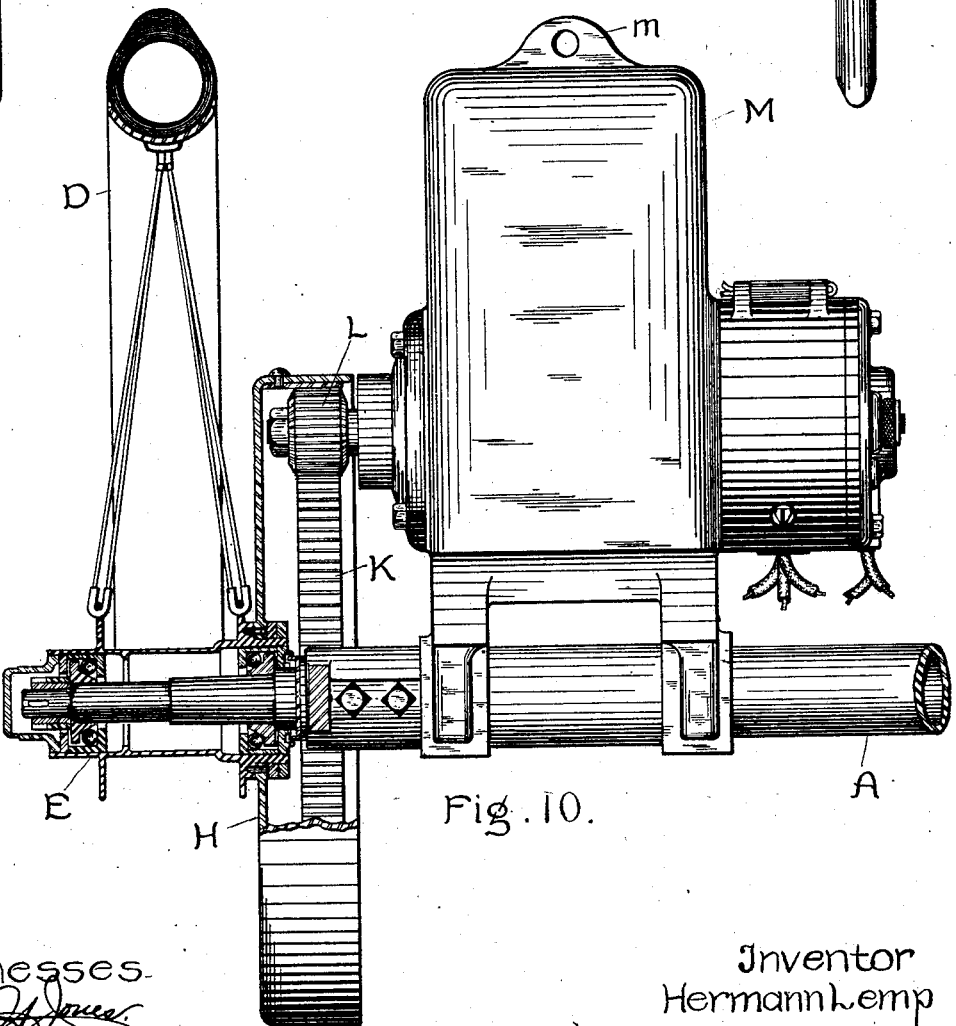
Witnesses
Inventor
Hermann Lemp

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

AUTOMOBILE VEHICLE.

SPECIFICATION forming part of Letters Patent No. 724,021, dated March 31, 1903.

Application filed April 25, 1900. Serial No. 14,216. (No model.)

*To all whom it may concern:*

Be it known that I, HERMANN LEMP, a citizen of the United States, residing at Lynn, county of Essex, State of Massachusetts, have invented certain new and useful Improvements in Automobile Vehicles, of which the following is a specification.

My invention relates to electrically-operated vehicles, and has for its object to provide an organization that will be effective under all conditions to which such vehicles are subjected in practical operation.

In the operation of electrical road-vehicles it has been found advisable in order to avoid strains on the axles and wheels and to facilitate steering to provide some means whereby the driving-wheels on the opposite sides of the vehicle may revolve at different speeds whenever the vehicle is turning a corner. One arrangement which has been provided for securing this result involves the use of independent motors for driving the wheels on the two sides of the vehicle. With motors thus arranged two different systems of connections have been employed, one in which the motors or their armatures on the opposite sides of the vehicle have been permanently connected in multiple and the other in which they have been connected permanently in series, the required changes in speed being obtained in either case by the insertion of resistances or by changing the potential of the source, or both. Each of these systems presents certain advantages; but neither is by itself effective under all the conditions which may arise. When motors on opposite sides of the vehicle are connected permanently in multiple, they tend to resist any rapid change of direction, due to the fact that the torque of the motor or motors on the inside is increased during the turning of the vehicle, and consequently when it is attempted to turn a corner with the motors thus connected the wheels are likely to be skidded and strains produced on the steering-handle that render steering difficult. On the other hand, with motors on opposite sides of the vehicle connected permanently in series an ideal arrangement is obtained for turning a corner. With this connection the torque of the motors is always equal, since they are supplied with the same current, and the speeds automatically adjust themselves. The motors operate in the same manner as a differential gearing, and the steering-handle may be freely moved without danger of skidding the wheels or producing undue strains on the steering-handle. When, however, the vehicle is running at full speed, it is a distinct advantage to have the motors on the opposite sides connected in multiple, for they will then resist any rapid change of direction and will therefore resist any quick movement of the steering-handle, which would be dangerous at high speeds.

Since sharp turns should never be made at full speed, I am enabled to obtain the advantages of both the series and the multiple connection without the disadvantages of either by so arranging the contacts of the controller that whenever the controller-handle is moved to a low-speed position motors on opposite sides of the vehicle will be connected in series, and whenever it is moved to a high-speed position they will be connected in multiple. Another advantage which results from such a system of connections over a permanent series connection and which is especially marked when but a single driving-wheel is provided on each side of the vehicle lies in the fact that full power may be applied to the wheels on one side irrespective of the condition of the wheels on the opposite side. This is often of extreme importance, as, for example, when a wheel (or wheels) on one side becomes stalled by an obstruction in the road. If under such conditions the motors on opposite sides are connected permanently in series, the wheel (or wheels) on the other side is liable to begin to slip, particularly if it happens to be over a low or soft spot in the road, and since the coefficient of sliding friction rapidly diminishes with the speed it will tend to increase in speed until the counter electromotive force of the motor connected thereto rises to such an extent that the current flowing through the motors is reduced to a very small amount, thus rendering it impossible to move the vehicle over the obstacle. With the multiple connection, however, the motors connected to the wheels which are stalled may be supplied with full current, irrespective of the conditions under which the motors on the opposite side of the vehicle are operating, and the supply of current is automatically regulated with reference to the needs of the motors.

For what I consider to be novel and my invention attention is called to the description and claims appended thereto.

In the drawings illustrating my invention, Figure 1 shows diagrammatically an arrangement of batteries and motors adapted for propelling a motor-vehicle, together with a controller for making the connections required by my invention. Figs. 2 to 8, inclusive, are diagrams illustrating the circuit connections for the different positions of the controller shown in Fig. 1. Figs. 9 and 10 illustrate the mounting on the vehicle of the motors diagrammatically illustrated in Figs. 1 to 8, inclusive.

Referring first to Fig. 9, A represents one of the axles of a motor-vehicle, D' and $D^2$ driving-wheels, which are independently mounted one at each end of said axle, and M' $M^2$ two motors, each of which is arranged to operate one of the driving-wheels on the vehicle and both of which are mounted in any suitable manner. As shown in the drawings, these two motors are pivoted at one end upon the axle A, it being understood that the other ends are supported by means of suitable connections between the projecting portions $m$ and the vehicle body or frame. The connection between each of the motors and its driving-wheel is more clearly illustrated in Fig. 10, in which A represents the axle of the vehicle, as before, and D the wheel, having a hub E, containing suitable bearings and arranged to freely revolve upon the axle A. At the inner end of the hub E a cup-shaped flange H is rigidly fastened, and this flange carries on its inner periphery an internal gear K, which meshes with a pinion L, mounted on the armature-shaft of the motor.

Referring now to Fig. 1, B' and $B^2$ represent two sets of storage batteries carried by the motor-vehicle; A' and F', the armature and field windings, respectively, of the motor M'; $A^2$ and $F^2$, the armature and field windings of the motor $M^2$, and R a resistance used to control the flow of current when the motors are operated as braking generators. The storage batteries, the regulating resistance, and the armature and field windings of the two motors are suitably connected to the fixed contacts of the controller C. This controller comprises fixed contacts, represented by small circles $a'$ to $a^{13}$, inclusive, and movable contacts, represented by the rectangles $b$. These contacts are all shown developed on a plane surface, as is customary in diagrammatically illustrating such a structure. In actual construction, however, the rectangular contacts are mounted on the surface of a cylinder and are arranged to be successively brought into contact with a set of fixed brushes, represented by the small circles. This construction is well known in the art, and it is therefore considered unnecessary to illustrate the same. The particular type of controller illustrated in this figure constitutes no part of my invention in this present case, a controller of this type having been shown, described, and claimed in my prior application, Serial No. 695,942, filed November 9, 1898.

It is only essential for the purposes of my present invention that the controller-contacts should in the low-speed position connect the motors in series and in the high-speed positions in multiple in a manner to be hereinafter described; but I have deemed it advisable to show a complete controller of the type which is used in actual practice.

I have found it advisable in the practical application of my invention to connect the field-windings of the motors in permanent circuit relation and to change the motors from series to multiple relation by changing the connections between the armature-windings only. By such an arrangement I am enabled to render the variations in speed between the several positions of the controller less abrupt and also to simplify the controller construction and the system of wiring joining the storage batteries and motors to the said controller.

The circuit connections between the motors and the controller are so arranged that the field-windings F' and $F^2$ of the two motors are permanently connected in multiple. Corresponding points in the two field-windings are permanently connected together and to one of the fixed contacts of the controller, and in the last power position a portion of each field-winding is rendered inoperative.

Figure 2:
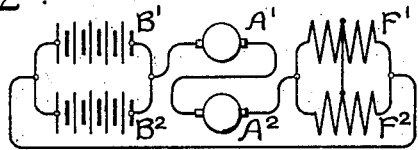

In the first operative position of the controller when the fixed contacts $a'$ to $a^{13}$, inclusive, lie along the line 1 1 the two sets of storage batteries will be connected in multiple and the armatures of the two motors will be connected in series with each other between the batteries and the field-windings of the two motors also connected in multiple. These connections are shown in Fig. 2.

Figure 3:
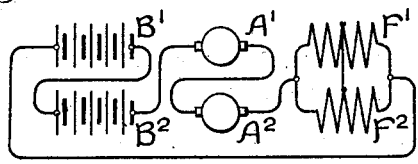

With the controller in its second power position the connections will be those shown in Fig. 3, the motor-windings remaining connected as before and the two sets of storage batteries being connected in series instead of in multiple.

Figure 4:
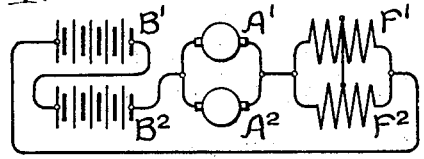
Figure 6:
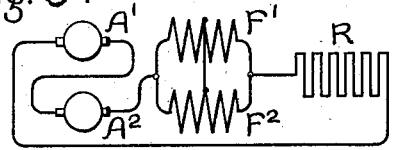
Figure 7:
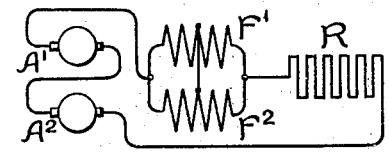
Figure 8:
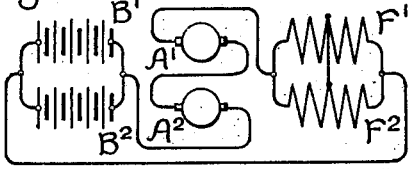
Figure 5:
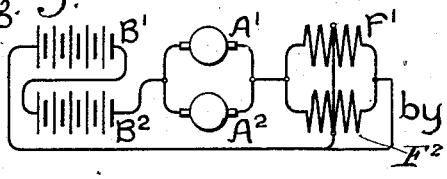

When the controller is moved to its third power position, the armature-windings of the two motors will be connected in multiple, as shown in Fig. 4, and when the controller is in its fourth or last power position a portion of the field-windings will be cut out, as is shown in Fig. 5. The connections made by the controller in its off position, in its braking position, and in the position for running backward are shown in Figs. 6 to 8, inclusive. The field-windings of the two motors are always connected in multiple, and only the relative connections of the armature-windings are changed.

I have illustrated my invention in its simplest form as applied to a vehicle having only two driving-motors; but it is evident that I am not limited to any particular number of motors.

In the embodiment of my invention which I have illustrated I have shown two propelling-motors mounted on the fixed axle of a motor-vehicle; but it is to be understood that I am not limited to such an arrangement. The two motors may be mounted to drive the steering-wheels with equal advantage.

What I claim as new, and desire to secure by Letters Patent of the United States, is—

1. In combination in an electric vehicle, independent driving-wheels for the two sides of said vehicle, independent motors for operating said wheels, each motor having a series field-winding which is connected to the other through a bridging connection, and a series-multiple controller operatively connected to the windings of said motors.

2. In combination in an electric vehicle, independent driving-wheels for the two sides of said vehicle, independent motors for operating said wheels, series field-windings for the motors which are permanently connected through a bridging connection, and means for connecting the motor-armatures on opposite sides of said vehicle in series or in multiple.

3. In combination in an electric vehicle, independent driving-wheels for the two sides of said vehicle, independent motors for operating said wheels, field-windings for the motors, a connection which connects corresponding points in the field-windings together and to the controller, and a series-multiple controller for connecting the armature-windings on opposite sides of said vehicle in series for low speeds, and in multiple for high speeds.

4. In combination, in an electric vehicle, driving-wheels on said vehicle, a motor operatively connected with each of said wheels, means for connecting the field-windings of said motors in permanent circuit relation, and means for connecting the armature-windings of the motors on opposite sides in series or in multiple relation with each other and in series with said field-windings.

5. In combination, in an electric vehicle, driving-wheels on said vehicle, a motor operatively connected with each of said wheels, means for connecting the field-windings of said motors in permanent circuit relation, and a controller for connecting the armature-windings of the motors on opposite sides in series, or in multiple relation with each other and in series with said field-windings.

In witness whereof I have hereunto set my hand this 21st day of April, 1900.

HERMANN LEMP.

Witnesses:
DUGALD MCKILLOP,
JOHN P. PLUMSTEAD.